(12) United States Patent
Yilmaz

(10) Patent No.: US 11,750,931 B2
(45) Date of Patent: Sep. 5, 2023

(54) IMAGER TIME AND LIGHTING HEAT BALANCING

(71) Applicant: Veoneer US, LLC, Southfield, MI (US)

(72) Inventor: Mehmet Fatih Yilmaz, Plymouth, MI (US)

(73) Assignee: VEONEER US INC., Veoneer US Inc., MI (US)

( * ) Notice: Subject to any disclaimer, the term of this patent is extended or adjusted under 35 U.S.C. 154(b) by 105 days.

(21) Appl. No.: 17/558,710

(22) Filed: Dec. 22, 2021

(65) Prior Publication Data

US 2023/0199318 A1 Jun. 22, 2023

(51) Int. Cl.
| | |
|---|---|
| *H04N 23/72* | (2023.01) |
| *H04N 23/52* | (2023.01) |
| *H04N 23/20* | (2023.01) |
| *H04N 7/18* | (2006.01) |

(52) U.S. Cl.
CPC .............. *H04N 23/72* (2023.01); *H04N 7/185* (2013.01); *H04N 23/20* (2023.01); *H04N 23/52* (2023.01)

(58) Field of Classification Search
CPC ...... H04N 1/00978; H04N 5/33; H04N 23/20; H04N 23/21; H04N 23/23; H04N 23/52; H04N 23/56; H04N 23/57; H04N 23/651; H04N 23/72; H04N 23/73; H04N 23/74
See application file for complete search history.

(56) References Cited

U.S. PATENT DOCUMENTS

| | | | |
|---|---|---|---|
| 2003/0025065 A1* | 2/2003 | Hashimoto | H04N 23/74 348/E5.037 |
| 2010/0074610 A1* | 3/2010 | Trevelyan | G03B 15/03 396/158 |

\* cited by examiner

*Primary Examiner* — Daniel M Pasiewicz
(74) *Attorney, Agent, or Firm* — Christopher P. Maiorana, PC

(57) ABSTRACT

An apparatus comprising a memory and a processor. The memory may comprise first parameters for an image sensor and second parameters for a LED. The processor may be configured to receive a first temperature from the image sensor, receive a second temperature from the LED, present a first adjustment to the image sensor and present a second adjustment to the LED. The first adjustment may be configured to scale the first parameters based on a difference between the first temperature and the predetermined temperature. The second adjustment may be configured to scale the second parameters based on a difference between the second temperature and the predetermined temperature. The processor may scale the first parameters and the second parameters in order to compensate for performance degradation of the image sensor caused by changes in the first temperature and the LED caused by changes in the second temperature.

18 Claims, 8 Drawing Sheets

IMAGER TIME AND LIGHTING HEAT BALANCING

FIELD OF THE INVENTION

The invention relates to vehicle monitoring systems generally and, more particularly, to a method and/or apparatus for implementing imager time and lighting heat balancing.

BACKGROUND

In-cabin monitoring systems (ICMS) use near-infrared (IR) light-emitting diodes (LEDs) for illumination and image sensors for image capturing. Both the image sensors and the IR LEDs are prone to overheating. Overheating results in performance degradation. In some scenarios extreme overheating can even result in the devices breaking down.

ICMS must be capable of operating in various environments (i.e., hot and cold environments). ICMS is relied on to provide real-time results that other vehicle systems may rely on. If the images sensors or IR LEDs are incapable of providing the expected functionality due to overheating, then the ICMS will not be able to provide reliable output. Preventing image sensors and IR LEDs from overheating is needed to ensure reliable operation of ICMS.

It would be desirable to implement imager time and lighting heat balancing.

SUMMARY

The invention concerns an apparatus comprising a memory and a processor. The memory may comprise first parameters for an image sensor and second parameters for a light emitting device. The processor may be configured to receive a first temperature signal from the image sensor, receive a second temperature signal from the light emitting device, present a first adjustment signal to the image sensor and present a second adjustment signal to the light emitting device. The first parameters and the second parameters may correspond to a predetermined temperature. The first adjustment signal may be configured to scale the first parameters based on a difference between the first temperature signal and the predetermined temperature. The second adjustment signal may be configured to scale the second parameters based on a difference between the second temperature signal and the predetermined temperature. The processor may scale the first parameters and the second parameters in order to compensate for performance degradation of the image sensor caused by changes in the first temperature signal and the light emitting device caused by changes in the second temperature signal.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
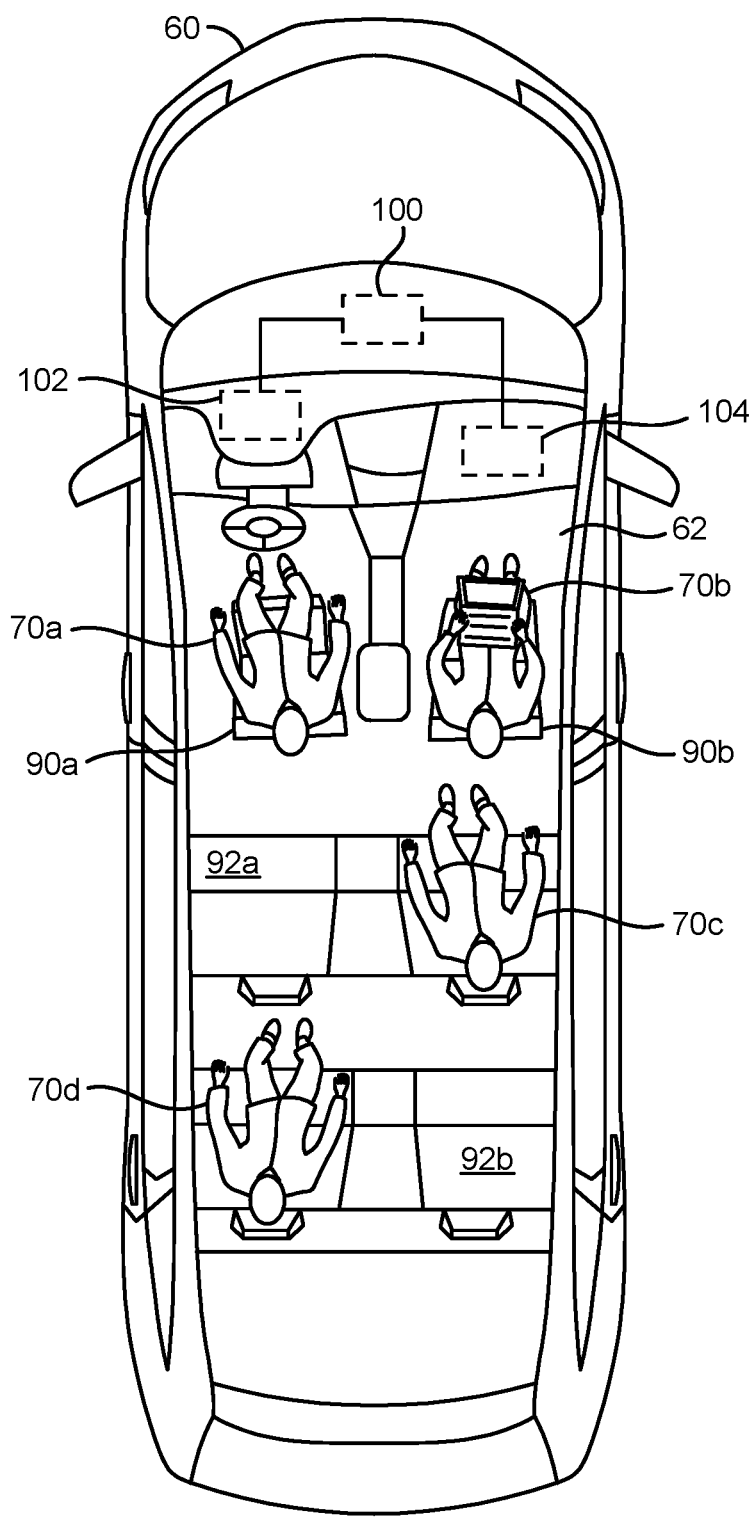
FIG. 1 is a diagram illustrating an example embodiment of the present invention.

Embodiments of the present invention include providing imager time and lighting heat balancing that may (i) be implemented as part of an in-cabin monitoring system, (ii) prevent performance degradation due to overheating, (iii) read a temperature from an image sensor, (iv) read a temperature for near-infrared LEDs, (v) implement a PTC resistor to read a temperature, (vi) adjust power settings of an LED in response to a high temperature, (vii) adjust exposure settings of an image sensor in response to a high temperature, (viii) compensate by adjusting settings of the LEDs when imager settings are reduced for cooling, (xi) compensate by adjusting settings of the imager when LED settings are reduced for cooling, (x) notify other vehicle components in response to temperature readings, (xi) extrapolate settings from a lookup table and/or (xii) be implemented as one or more integrated circuits.

Embodiments of the present invention may be configured to implement an in-cabin monitoring system (ICMS). The ICMS may be configured to use near-infrared light-emitting diodes (IR-LEDS) for illumination and image sensors for capturing images within the cabin of a vehicle. The ICMS may be implemented to monitor occupants within the vehicle, determine information about the occupants and enable various features of the vehicle to perform reactions in response to the occupants. In an example, ICMS may monitor a driver to detect whether the driver is falling asleep (e.g., drowsiness detection) and a warning may be generated to alert the driver. Various safety and/or convenience features may be implemented based on information generated by the ICMS. The number and/or types of features implemented by the ICMS may be varied according to the design criteria of a particular implementation.

Without the management performed by embodiments of the present invention, both the imagers (or image sensors) and IR-LEDs may be prone to overheating. Overheating may result in performance degradation (e.g., incorrect readings, slower performance, unreliable output, etc.). Overheating (e.g., excessive heat) may result in breakdowns of the imagers and/or IR-LEDs. Embodiments of the present invention may be configured to perform compensation in order to prevent overheating.

In one example, when the IR-LEDs are determined to become too hot, power settings for the IR-LEDs may be reduced (e.g., to allow the IR-LEDs to cool off). In order to compensate for the lower power settings (e.g., reduced light intensity) of the IR-LEDs, a complementary feature of the imagers may be adjusted. In an example, an exposure time of the imager may be increased for compensation. In another example, when the imagers are determined to become too hot, exposure settings for the imagers may be reduced (e.g., to allow the imagers to cool off). In order to compensate for the lower exposure time settings of the imagers, a complementary feature of the imagers may be adjusted. In an example, the power settings of the LEDs may be increased (e.g., a greater amount of light intensity) for compensation.

Generally, the imagers may provide a temperature reading that may be polled. In some embodiments, the circuit boards for the IR-LEDs may similarly provide temperature readings. In some embodiments, a positive temperature coefficient (PTC) resistor may be added to enable the IR-LED temperature to be monitored. In some embodiments, an IR-LED current may be used to infer a temperature of the IR-LEDs. For example, the IR-LED current may vary based on temperature. The respective temperature of each module may be determined. The exposure time of the imager and/or the LED power settings may be adjusted depending on the temperature range of the temperatures measured (e.g., high, medium, low).

Exposure and power settings may be stored in a lookup table. Due to a difficulty of calibration, the lookup table may store parameters that correspond to a predefined temperature (e.g., room temperature). Settings for a detected temperature may be extrapolated based on a difference from the predefined temperature. Extrapolating temperatures may enable one set of parameters to be stored instead of multiple sets of parameters for multiple temperatures.

Referring to FIG. 1, a diagram illustrating an example embodiment of the present invention is shown. A vehicle 60 is shown. In one example, the vehicle 60 may be an electric vehicle (Ev). In another example, the vehicle 60 may be a hybrid-electric vehicle. In yet another example, the vehicle 60 may be an internal combustion engine (ICE) vehicle. The type of the vehicle 60 and/or the operating status of the vehicle 60 may be varied according to the design criteria of a particular implementation.

A top down view of the vehicle 60 is shown. An interior 62 of the vehicle 60 is shown. The interior 62 of the vehicle 60 is shown enclosed (e.g., doors are closed and windows are shut). The top down view of the vehicle 60 is illustrated with a top of the vehicle 60 shown as a cutaway to provide a view of the interior 62.

People 70a-70d are shown within the interior 62 of the vehicle 60. The people 70a-70d may represent passengers and/or a driver of the vehicle 60. In the example shown, the people 70a-70d are illustrated as adults. However, the one or more of the people 70a-70d in the vehicle 60 may be any combination of children, teenagers, infants, adults, the elderly, differently-abled people, incapacitated people, etc. The number and/or characteristics of the people 70a-70d may be varied according to the design criteria of a particular implementation.

Seats 90a-90b are shown in the interior 62. The person 70a is shown in the seat 90a (e.g., a driver in the driver seat 90a). The person 70b is shown in the seat 90b (e.g., a passenger in the front passenger seat 90b). The seats 90a-90b may be a front row of seats of the vehicle 60.

Seat rows 92a-92b are shown. The seat row 92a may be a middle seat row. The person 70c is shown sitting in the middle seat row 92a. The seat row 92b may be a rear seat row. The person 70d is shown sitting in the rear seat row 92b. In the example shown, the vehicle 60 may be illustrated as a vehicle with three rows of seats (e.g., the front row comprising the seats 90a-90b and the seat rows 92a-92b). In the example shown, the seats 90a-90b and the seat rows 92a-92b are shown facing forward (e.g., towards a front end of the vehicle 60). In some embodiments, one or more of the seats 90a-90b and/or individual seats in the seat rows 92a-92b may face forward, backwards, may be rotated at an angle, may be upright, may be reclined, etc. The arrangement of the people 70a-70d in the seats 90a-90b and/or the seat rows 92a-92b, the number of seats, the location of seats and/or the arrangement of seats in the vehicle 60 may be varied according to the design criteria of a particular implementation.

The vehicle 60 may comprise a block (or circuit) 100, a block (or circuit) 102 and/or a block (or circuit) 104 is shown. The circuit 100 may implement an apparatus (e.g., a microprocessor and a memory, an electronic control unit, a system on a chip (SoC), an application specific integrated circuit (ASIC), etc.). Details of the components of the apparatus 100 may be described in association with FIG. 2. The circuit 102 may implement an infrared (or near infrared) light emitting device (IR-LED) circuitry. The circuit 104 may implement an imager (e.g., an image sensor and/or other circuitry). The vehicle 60 may comprise other components (not shown). The number type and/or arrangement of the components of the vehicle 60 may be varied according to the design criteria of a particular implementation.

The apparatus 100 may be configured to read data from the IR-LED 102 and/or the imager 104. The apparatus 100 may be configured to adjust one or more configurable parameters of the IR-LED 102 and/or the imager 104. In an example, the apparatus 100 may be configured to read a temperature of the IR-LED 102 and/or read a temperature of the imager 104. In another example, the apparatus 100 may be configured to adjust at least one parameter (e.g., power settings) of the IR-LED 102. In yet another example, the apparatus 100 may be configured to adjust at least one parameter (e.g., an exposure time) of the imager 104.

The apparatus 100 may operate as an electronic control unit (ECU) for the IR-LED 102, the imager 104 and/or other devices. In an example, the apparatus 100 may be an ECU for the ICMS. In another example, the apparatus 100 may be an ECU configured to provide control for the ICMS and other components of the vehicle 60. In an example, the apparatus 100 may be configured to control an alarm system, intrusion systems, comfort/entertainment systems, etc. The apparatus 100 may be configured to receive and/or communicate data from/to a radar device. For example, the apparatus 100, the IR-LED 102, the imager 104 and/or other components may implement a suite of sensors used for an ICMS. The suite of sensors for the ICMS may be configured to operate while the vehicle 60 is turned on (e.g., powered on, driving, idling, etc.) and/or while the vehicle 60 is turned off (e.g., powered off, parked, etc.).

The IR-LED 102 may be configured to generate infrared and/or near infrared light. The light generated by the IR-LED 102 may provide illumination for the imager 104. The IR-LED 102 may be configured to generate light that may be outside of the light spectrum visible to the human eye. The IR-LED 102 may be configured to adjust an amount, an intensity, a direction, a timing, etc. of the light generated.

The imager 104 may be configured to capture images. In some embodiments, the imager 104 may implement an IR image sensor configured to generate images in response to captured IR light. In some embodiments, the imager 104 may comprise an RGB-IR sensor configured to generate images in response to captured IR light and visible light (e.g., RGB) simultaneously. The imager 104 may use the illumination provided by the IR-LED 102 to generate the IR images.

The apparatus 100, the IR-LED 102 and/or the imager 104 may be configured to enable the generation of color and IR monochrome images simultaneously for Occupancy Monitoring System (OMS) and Driver Monitoring System (DMS). The apparatus 100 may be configured to implement various image signal processing techniques to process data from the imager 104. The apparatus 100, the IR-LED 102 and/or the imager 104 may be configured to operate in low to no ambient light conditions within the interior 62. In one example, the IR-LED 102 may generate light at approximately 940 nm wavelength. The imager 104 may provide images for day and night machine vision applications and/or provide IR-enhanced RGB images during daytime conditions.

The apparatus 100, the IR-LED 102 and/or the imager 104 (or other components of the vehicle 60) may be configured to detect biomarkers, shape, size information and/or behavioral information about the people 70a-70d. The apparatus 100 may be configured to detect features of the people 70a-70d that may be used to infer information about the people 70a-70d detected. In one example, the characteristics of the people 70a-70d detected may be used to infer an age range of each of the people 70a-70d. In another example, the characteristics of the people 70a-70d detected may be used to infer a status of each of the people 70a-70d (e.g., awake, asleep, in distress, incapacitated, etc.). In yet another example, the characteristics of the people 70a-70d may be used to infer a body position of each of the people 70a-70d (e.g., sitting upright, leaning against a window, lying down, etc.). The apparatus 100, the IR-LED 102 and/or the imager 104 may be used for eye tracking (e.g., driver alertness), detecting driver distraction (e.g., smartphone usage), etc. The types of characteristics detected and/or the inferences about the people 70a-70d determined in response to the characteristics detected using the apparatus 100, the IR-LED 102 and/or the imager 104 may be varied according to the design criteria of a particular implementation.

In the example shown, the passengers 70a-70d may comprise people. Generally, the characteristics of the people 70a-70d detected and/or information inferred about the people 70a-70d may be applicable to human passengers. The apparatus 100, the IR-LED 102 and/or the imager 104 may be configured to determine characteristics and/or infer information about other types of living beings (e.g., dogs, cats, etc.).

Figure 2:
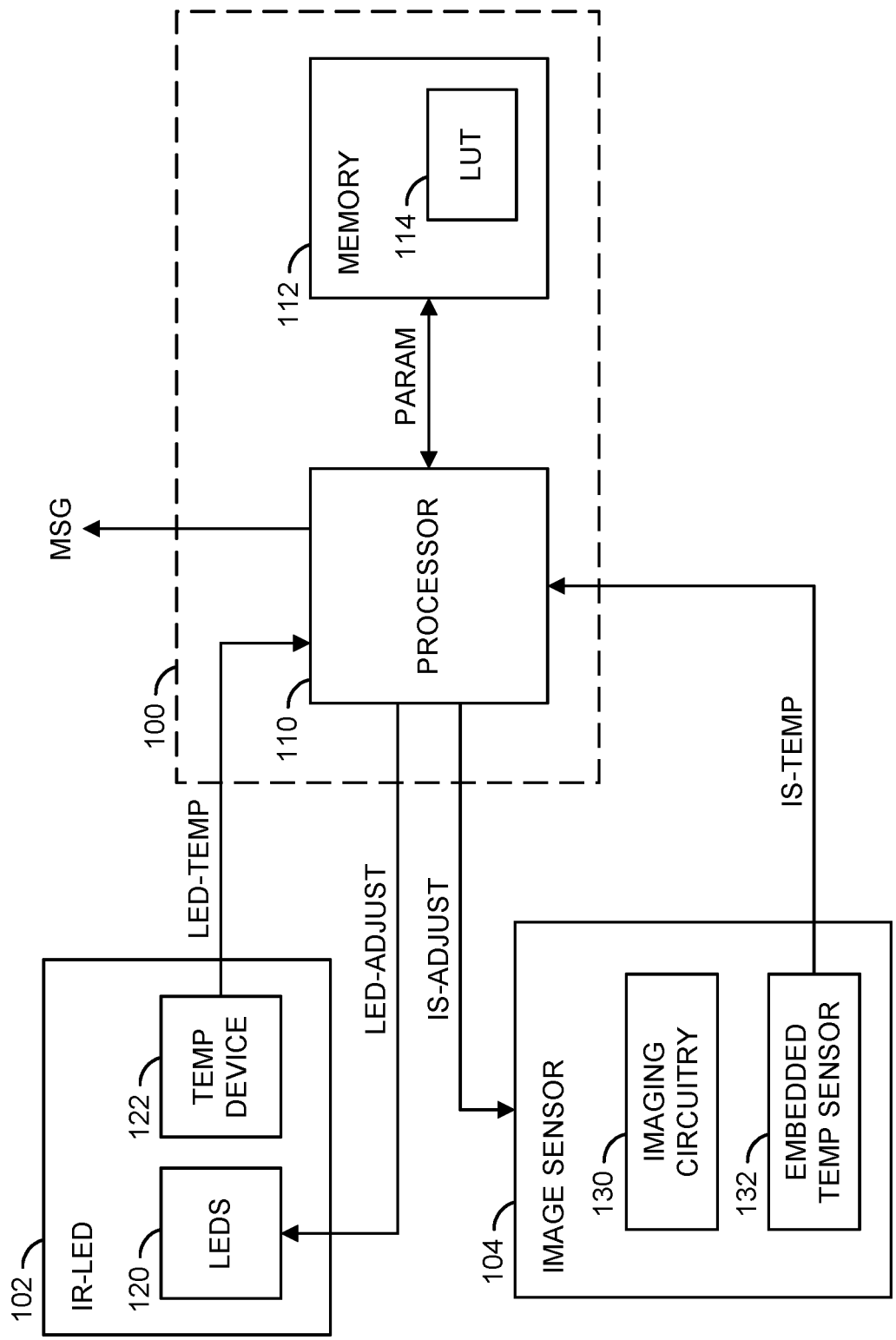
FIG. 2 is a block diagram illustrating an example embodiment of the present invention.

Referring to FIG. 2, a block diagram illustrating an example embodiment of the present invention is shown. The apparatus 100, the IR-LED 102 and/or the imager 104 are shown. The apparatus 100 is shown presenting a signal (e.g., LED-ADJUST), a signal (e.g., IS-ADJUST) and/or a signal (e.g., MSG). The apparatus 100 is shown receiving a signal (e.g., LED-TEMP) and/or a signal (e.g., IS-TEMP). The signal LED-ADJUST may be communicated to the IR-LED 102. The signal IS-ADJUST may be communicated to the imager 104. The signal LED-TEMP may be communicated by the IR-LED 102. The signal IS-TEMP may be communicated by the image sensor 104. The signal MSG may be communicated to other components (e.g., an electronic bus). The number, type and/or format of the signals communicated between the apparatus 100, the IR-LED 102 and/or the imager 104 may be varied according to the design criteria of a particular implementation.

The apparatus 100 may comprise a block (or circuit) 110 and/or a block (or circuit) 112. The circuit 110 may implement a processor. The circuit 112 may implement a memory. The apparatus 100 may comprise other components (not shown). The number, type and/or arrangement of the components of the apparatus 100 may be varied according to the design criteria of a particular implementation.

The processor 110 may be configured to receive the signal LED-TEMP and/or the signal IS-TEMP. The processor 110 may be configured to generate the signal LED-ADJUST, the signal IS-ADJUST and/or the signal MSG. The processor 110 may be configured to communicate (e.g., send/receive data) with the memory 112. A signal (e.g., PARAM) may represent the communication between the processor 110 and the memory 112.

The signal LED-TEMP may provide information about a parameter of the IR-LED 102. The processor 110 may read the parameter from the IR-LED 102. In an example, the parameter may be a temperature of the IR-LED 102. The signal IS-TEMP may provide information about a parameter of the imager 104. The processor 110 may read the parameter from the imager 104. In an example, the parameter may be a temperature of the imager 104.

In some embodiments, the processor 110 may be configured to infer the temperature (e.g., of the IR-LED 102 and/or the imager 104) in response to the parameter read. For example, the temperature may not be read directly from the IR-LED 102 and/or the imager 104. In an example, the processor 110 may read a current through (or a voltage across) a particular circuit and/or element of the IR-LED 102 and/or the imager 104 and determine a temperature based on the current reading (or voltage reading).

The processor 110 may be configured to generate the signal LED-ADJUST in response to the signal LED-TEMP. The processor 110 may be configured to generate the signal IS-ADJUST in response to the signal IS-TEMP. The signal LED-ADJUST and the signal IS-ADJUST may each be adjustment signals. The signal LED-ADJUST may be configured to adjust a parameter of the IR-LED 102. In an example, the parameter of the IR-LED 102 adjusted by the signal LED-ADJUST may be a power setting (e.g., affecting an intensity of light output). The signal IS-ADJUST may be configured to adjust a parameter of the imager 104. In an example, the parameter of the imager 104 adjusted by the signal IS-ADJUST may be an exposure time setting.

Generally, the parameters of the IR-LED 102 and/or the imager 104 adjusted by the processor 110 may be an operational characteristic that may correspond to an amount of heat generated (e.g., heat may be generated as a result of operation). For example, the IR-LED 102 may operate at a default power setting and a higher power setting may result in more heat generated by the IR-LED 102 and a lower power setting may result in less heat generated by the IR-LED 102. In another example, the imager 104 may operate at a default exposure time and a higher exposure time may result in more heat generated by the imager 104 and a lower exposure time may result in less heat generated by the imager 104. The parameters may also affect the functionality of the IR-LED 102 and/or the imager 104. In an example, increasing the power setting of the IR-LED 102 may result in a higher light intensity output and decreasing the power setting of the IR-LED 102 may result in a lower light intensity output. In another example, increasing the exposure time of the imager 104 may result in more time for the imager 104 to capture light input and decreasing the exposure time of the imager 104 may result in less time for the imager 104 to capture light input. The amount of light generated and/or the exposure time may affect the quality, consistency and/or reliability of the images generated from the imager 104.

The processor 110 may be configured to adjust the parameter(s) of the IR-LED 102 and/or the imager 104 in order to compensate for a performance degradation that may result in changes in temperature. For example, the processor 110 may generate the signal LED-ADJUST to decrease a power setting to compensate for a potential performance degradation of the IR-LED 102 caused by an increase in temperature of the IR-LED 102 (e.g., lowering the power settings may reduce an operating temperature of and/or cool off the IR-LED 102). In another example, the processor 110 may generate the signal IS-ADJUST to decrease an exposure time to compensate for a potential performance degradation of the imager 104 caused by an increase in temperature of the imager 104 (e.g., lowering the exposure time may reduce an operating temperature of and/or cool off the imager 104).

The memory 112 may be configured to store data. The memory 112 may comprise random access memory (RAM) and/or read only memory (ROM). The memory 112 may comprise computer readable instructions that may be executed by the processor 110. The memory 112 may be configured to provide storage for the temperature readings (or readings of other parameters) received by the processor 110. The memory 112 may comprise a block (or circuit) 114. The circuit 114 may comprise a lookup table (LUT). The memory 112 may comprise other components (not shown). The number, type and/or arrangement of the components and/or data stored in the memory 112 may be varied according to the design criteria of a particular implementation.

The memory 112 may store parameters for the IR-LED 102 and/or parameters for the imager 104. The parameters for the IR-LED 102 and the parameters for the imager 104 may be stored in the LUT 114. The parameters stored by the memory 112 may comprise default parameters for the IR-LED 102 and/or the imager 104. For example, the parameters stored by the memory 112 may be separate baseline settings used by the IR-LED 102 and the imager 104, which may be adjusted by the processor 110.

Parameters for the IR-LED 102 and/or the imager 104 for every temperature may comprise a large amount of storage space, which may make calibration provided entirely through storage in the memory 112 difficult. The memory 112 may store the default parameters for the IR-LED 102 and the imager 104 and the processor 110 may be configured to scale the parameters for calibration based on temperature readings. The parameters for the IR-LED 102 and the parameters for the imager 104 stored by the memory 112 may correspond to parameters for a predetermined temperature. In an example, the parameters stored by the memory 112 may correspond to a room temperature.

The processor 110 may be configured to scale the parameters for the IR-LED 102 in order to compensate for performance degradation of the IR-LED 102 caused by changes in the temperature of the IR-LED 102. The processor 110 may generate the signal LED-ADJUST to scale the parameters stored in the memory 112 (e.g., for power settings) based on a difference between the temperature read from the signal LED-TEMP and the predetermined temperature (e.g., room temperature).

The processor 110 may be configured to scale the parameters for the imager 104 in order to compensate for performance degradation of the imager 104 caused by changes in the temperature of the imager 104. The processor 110 may generate the signal IS-ADJUST to scale the parameters stored in the memory 112 (e.g., for exposure time settings) based on a difference between the temperature read from the signal IS-TEMP and the predetermined temperature (e.g., room temperature).

The IR-LED 102 may comprise a block (or circuit) 120 and/or a block (or circuit) 122. The circuit 120 may comprise light emitting diodes (LEDs). The circuit 122 may comprise a temperature device. The IR-LED 102 may comprise other components (not shown). The number, type and/or arrangement of the components of the IR-LED 102 may be varied according to the design criteria of a particular implementation.

The LEDs 120 may be configured to generate the infrared (IR) or near infrared (NIR) light. The amount and/or intensity of light generated by the LEDs 102 may be controlled in response to the power settings parameter. For example, increasing the power settings may result in more light (e.g., high intensity, a higher duty cycle, etc.) generated by the LEDs 120. In another example, decreasing the power settings may result in less light (e.g., low intensity, a lower duty cycle, etc.) generated by the LEDs 120. The generation of light by the LEDs 120 may generate heat. The amount of heat generated by the LEDs 120 may be greater for higher power settings than for lower power settings.

The LEDs 120 may receive the signal LED-ADJUST. The signal LED-ADJUST may be configured to adjust the power settings used by the LEDs 120 to generate the light. For example, the processor 110 may reduce an amount of heat generated by the LEDs 120 by lowering the power settings (at the cost of less light generated by the LEDs 120). In another example, the processor 110 may increase an amount of light generated by the LEDs 120 (e.g., at the cost of more heat generated by the LEDs 120) by increasing the power settings.

The temperature device 122 may be positioned on the circuit board for the IR-LED 102 near the LEDs 120. For example, the temperature device 122 may be adjacent to the LEDs 120. For example, the temperature device 122 may co-reside with the LEDs 120.

In some embodiments, the temperature device 122 may be an embedded temperature sensor implemented by the IR-LED 102. For example, the temperature device 122 may be configured to provide temperature readings for the IR-LED 102. The processor 110 may be configured to periodically poll the temperature device 122 to read the temperature of the LEDs 120. For example, the temperature device 122 may provide the signal LED-TEMP.

In some embodiments, the temperature device 122 may implement a positive temperature coefficient (PTC) resistor and/or a negative temperature coefficient (NTC) resistor. The PTC resistor 122 (or the NTC resistor 122) may be a component of the IR-LED 102. The PTC resistor 122 (or the NTC resistor 122) may have a linear resistance curve. The processor 110 may be configured to infer the temperature of the LEDs 120 based on measuring a resistance of the PTC resistor 122 (or the NTC resistor 122). For example, the processor 110 may measure a current through and/or a voltage across the PTC resistor 122 (or the NTC resistor 122) to determine the temperature of the LEDs 120. In one example, the signal LED-TEMP may comprise a reading of the current through the PTC resistor 122 (or the NTC resistor 122). In another example, the signal LED-TEMP may comprise a reading of the voltage across the PTC resistor 122 (or the NTC resistor 122). The PTC resistor 122 (or the NTC resistor 122) may have functionality for the IR-LED 102 other than providing the temperature. For example, the processor 110 may be configured to leverage (e.g., recycle information from) a component with a predefined functionality to determine the temperature.

In some embodiments, the temperature device 122 may comprise a voltage sensor that may be used for a reading from the LEDs 120. For example, the diodes of the LEDs 120 may have a drop voltage that is dependent on the temperature. The processor 110 may use the overvoltage characteristic of the diodes of the LEDs 120 to determine the temperature. The diodes of the LEDs 120 may be implemented having a flat drop voltage across a wide temperature range. For example, if the LEDs 120 have a same current and/or voltage drop across an operating temperature range, the temperature may be determined from the voltage sensor. The voltage sensor may be implemented by the IR-LED 102 for other functionality (e.g., measure current through the diodes for short circuit detection) independent from providing a temperature. In one example, the signal LED-TEMP may comprise a reading of the voltage reading from the voltage sensor 122. The voltage sensor 122 may have functionality for the IR-LED 102 other than providing the temperature. For example, the processor 110 may be configured to leverage (e.g., recycle data from) a component with a predefined functionality to determine the temperature.

The imager 104 may comprise a block (or circuit) 130 and/or a block (or circuit) 132. The circuit 130 may comprise imaging circuitry. The circuit 132 may comprise an embedded temperature sensor. The imager 104 may comprise other components (not shown). The number, type and/or arrangement of the components of the imager 104 may be varied according to the design criteria of a particular implementation.

The imaging circuitry 130 may be configured to enable the imager 104 to receive the IR (or NIR) and/or the RGB light input and convert the light input into computer readable information. The imaging circuitry 130 may enable the imager 104 to generate IR video frames and/or RGB video frames. In some embodiments, the data generated by the imaging circuitry 130 may be presented to the processor 110 and the processor 110 may generate the IR video frames and/or RGB video frames.

The imaging circuitry 130 may be configured to control various settings and/or parameters of the imager 104. In some embodiments, the imaging circuitry 130 may provide a global shutter. In some embodiments, the imaging circuitry 130 may provide a rolling shutter. In one example, the imaging circuitry 130 may be configured to control a timing and/or a sequence of the exposure of the image sensor 104. In another example, the imaging circuitry 130 may be configured to control a zoom, tilt and/or pan of the imager 104 (or a camera lens). The signal IS-ADJUST may be configured to modify one or more parameters of the imaging circuitry 130. The parameters controlled by the imaging circuitry 130 may be varied according to the design criteria of a particular implementation.

The embedded temperature sensor 132 may be configured to measure a temperature of the imager 104. The embedded temperature sensor 132 may be a temperature sensor built-in to the imager 104. The embedded temperature sensor 132 may be polled by devices external from the imager 104 to provide a temperature readout. In an example, the imager 104 may comprise a bank of diodes that may be used to infer the temperature of the imager 104 (e.g., based on a linear relationship between voltage and temperature of the diodes). The embedded temperature sensor 132 may provide the signal IS-TEMP in response to a polling operation performed by the processor 110. The method of measuring temperature by the embedded temperature sensor 132 may be varied according to the design criteria of a particular implementation.

Figure 3:
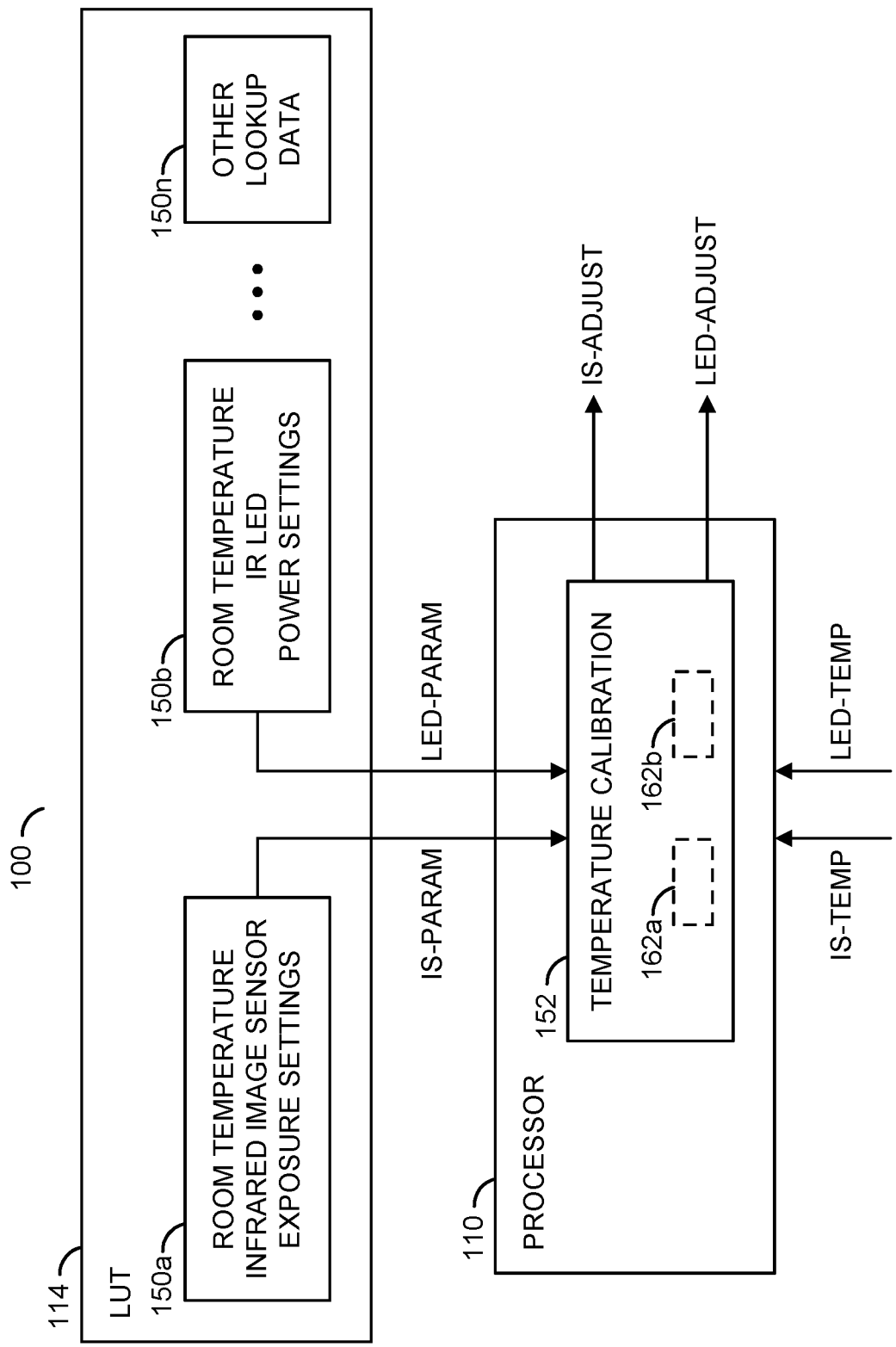
FIG. 3 is a block diagram illustrating reading device parameters from a memory.

Referring to FIG. 3, a block diagram illustrating reading device parameters from a memory is shown. The processor 110 and the LUT 114 of the apparatus 100 is shown. The LUT 114 is shown communicating a signal (e.g., IS-PARAM) and a signal (e.g., LED-PARAM). The processor 110 may generate the signal IS-ADJUST in response to the signal IS-PARAM. The processor 110 may generate the signal LED-ADJUST in response to the signal LED-PARAM. Other signals may be communicated between the processor 110 and the memory 112 (not shown). The number, type and/or format of signals communicated between the components of the apparatus 100 may be varied according to the design criteria of a particular implementation.

The LUT 114 may comprise data storage 150a-150n. The data storage 150a-150n may comprise an indexed array of values that may be retrieved by the processor 110. For example, the data storage 150a-150n may comprise precalculated data for various operations that may be retrieved by the processor 110 instead of using resources of the processor 110 to perform the calculations. The data storage 150a may comprise exposure settings for the imager 104 at a predetermined temperature. The data storage 150b may comprise power settings for the IR-LED 102 at the predetermined temperature. The data storage 150n may comprise other lookup data.

The exposure settings at a predetermined temperature 150a may comprise parameters used by the imager 104. In an example, the parameters stored by the exposure settings at a predetermined temperature 150a may be used to initialize the imager 104 at a startup time (or after waking up from a low power or sleep mode of operation). In the example shown, the exposure settings at a predetermined temperature 150a may be the parameters to set the exposure time of the imager 104 at room temperature. The processor 110 may receive the signal IS-PARAM to read the exposure settings at a predetermined temperature 150a.

The power settings at a predetermined temperature 150b may comprise parameters used by the IR-LED 102. In an example, the parameters stored by the power settings at a predetermined temperature 150b may be used to initialize the IR-LED 102 at a startup time (or after waking up from a low power or sleep mode of operation). In the example shown, the power settings at a predetermined temperature 150b may be the parameters to set the power settings of the IR-LED 102 at room temperature. The processor 110 may receive the signal LED-PARAM to read the exposure settings at a predetermined temperature 150b.

To conserve resources, the data storage 150a-150b (e.g., exposure settings for the imager 104 and power settings for the IR-LED 102) may comprise the precalculated values at the predetermined temperature instead of storing precalculated values for all temperatures. Generally, the power settings for the IR-LED 102 and the imager 104 may be difficult to calibrate for all temperatures. Storing calibration data for all temperatures may result in a large size of the LUT 114. In an example, for room temperature settings (e.g., one temperature value), the exposure settings at a predetermined temperature 150a may comprise nine calibrated values implemented as a 3×3 matrix and the power settings at a predetermined temperature 150b may also comprise nine calibrated values implemented as a 3×3 matrix. Adding calibrated values for additional temperatures (e.g., a high temperature, a medium temperature) for both the power settings and the exposure settings may result in matrices that are larger (e.g., nonlinear growth). Calibrating larger and larger matrices of data values may result in large storage resources in the LUT 114 and require significant human resources to perform the calibration before deployment of the ICMS.

Storing only the parameters for one predetermined temperature (e.g., room temperature) may limit the size of the data storage 150a-150b for the LUT 114. The predetermined temperature for the parameters stored in the data storage 150a-150b may be a temperature used for testing to calculate the parameters stored in the data storage 150a-150b. In an example, the predetermined temperature for the parameters stored in the data storage 150a-150b may be between approximately 20-25 degrees Celsius. The parameters stored in the data storage 150a-150b may correspond to a single temperature value (e.g., 20 degrees Celsius). In some embodiments, the predetermined temperature used for the exposure settings in the data storage 150a may be the same temperature used for the power settings in the data storage 150b. In some embodiments, the predetermined temperature used for the exposure settings in the data storage 150a may be a different temperature than the temperature used for the power settings in the data storage 150b. The exact temperature used for precalculating the exposure settings at the predetermined temperature 150a and the power settings at the predetermined temperature 150b may be varied according to the design criteria of a particular implementation.

The other lookup data 150n may represent various other precalculated values stored by the LUT 114. The other lookup data 150n may comprise precalculated values for various functionality performed by the processor 110. The other lookup data 150n may or may not correspond to the IR-LED 102 and/or the imager 104. For example, the other lookup data 150n may comprise timing data, reference data for IR images, biometric information for the people 70a-70d, etc.

The processor 110 is shown comprising a block (or circuit) 152. The circuit 152 may implement a temperature calibration circuit. The temperature calibration circuit 152 may comprise blocks (or circuits) 162a-162b. The circuits 162a-162b may implement scalers. The processor 110 may comprise other components (not shown). The number, type and/or arrangement of the components of the processor 110 may be varied according to the design criteria of a particular implementation.

The temperature calibration circuit 152 may be configured to receive the signal IS-PARAM and the signal LED-PARAM. The temperature calibration circuit 152 may be configured to generate the signal IS-ADJUST in response to the signal IS-PARAM and the signal IS-TEMP. The temperature calibration circuit 152 may be configured to generate the signal LED-ADJUST in response to the signal LED-PARAM and the signal LED-TEMP.

The scaler 162a may be configured to scale (or modify) the parameters from the data storage 150a for the imager 104. The scaler 162a may be configured to determine a difference between the temperature of the imager 104 (e.g., from the signal IS-TEMP) and the predetermined temperature that corresponds to the data storage 150a. The scaler 162a may perform a scaling operation on the parameter from the data storage 150a in response to the difference between the temperature of the imager 104 and the predetermined temperature. In an example, the scaler 162a may apply a coefficient to the precalibrated values for the exposure settings in the data storage 150a. The result of the scaling operation may be updated (or adjusted) parameters for the imager 104. The updated parameters may be transmitted to the imager 104 via the signal IS-ADJUST. In an example, the scaler 162a may scale the parameters stored in the data storage 150a in order to compensate for potential performance degradation of the imager 104 caused by the current operating temperature of the imager 104.

The scaler 162b may be configured to scale (or modify) the parameters from the data storage 150b for the IR-LED 102. The scaler 162b may be configured to determine a difference between the temperature of the IR-LED 102 (e.g., from the signal LED-TEMP) and the predetermined temperature that corresponds to the data storage 150b. The scaler 162b may perform a scaling operation on the parameter from the data storage 150b in response to the difference between the temperature of the IR-LED 102 and the predetermined temperature. In an example, the scaler 162b may apply a coefficient to the precalibrated values for the power settings in the data storage 150b. The result of the scaling operation may be updated (or adjusted) parameters for the IR-LED 102. The updated parameters may be transmitted to the IR-LED 102 via the signal LED-ADJUST. In an example, the scaler 162b may scale the parameters stored in the data storage 150b in order to compensate for potential performance degradation of the IR-LED 102 caused by the current operating temperature of the IR-LED 102.

The amount of heat generated by the IR-LED 102 may be linearly related to the power settings of the LEDs 120. Similarly, the amount of heat generated by the imager 104 may be linearly related to the exposure time of the imaging circuitry 130. When the temperature measurements performed by the processor 110 indicate that the IR-LED 102 and/or the imager 104 are overheating, the processor 110 may perform the scaling calculations to compensate. The temperature calibration circuit 152 may determine the difference between the predetermined temperature (e.g., an ideal operating temperature) and the measured temperature. The scaling operations performed by the temperature calibration circuit 152 may be used to determine updated parameters. In an example, the scaling operations performed by the temperature calibration circuit 152 may comprise extrapolating the settings stored in the LUT 114 in response to the difference between the current temperature and the ideal temperature. The updated parameters may adjust the exposure time of the imaging circuitry 130 and/or the power settings of the LEDs 120. The updated parameters may be configured to reduce the temperature from the overheating state back towards the default (or ideal) operating temperature.

The signal IS-ADJUST comprising updated parameters to lower the operating temperature of the imager 104 may negatively impact a performance of the imager 104. Since the imager 104 operates together with the IR-LED 102 towards a common function (e.g., generating IR, NIR and/or RGB images), to compensate for the negative performance impact (e.g., poor image quality due to reduced exposure time), the temperature calibration circuit 152 may be configured to compensate by adjusting a complementary parameter of the IR-LED 102. The signal LED-ADJUST comprising updated parameters to increase the power settings of the IR-LED 102 may compensate for the performance loss caused by the reduced exposure time (e.g., by providing more light). The scaler 162b may be configured to scale the power setting parameters from the data storage 150b in response to the amount of scaling of the exposure time parameters performed by the scaler 162a.

The signal LED-ADJUST comprising updated parameters to lower the operating temperature of the IR-LED 102 may negatively impact a performance of the IR-LED 102. Since the imager 104 works together with the IR-LED 102 towards a common function (e.g., generating IR, NIR and/or RGB images), to compensate for the negative performance impact (e.g., poor image quality due to reduced input light), the temperature calibration circuit 152 may be configured to compensate by adjusting a complementary parameter of the imager 104. The signal IS-ADJUST comprising updated parameters to increase the exposure time settings of the imager 104 may compensate for the performance loss caused by the reduced input light (e.g., by providing a longer exposure time). The scaler 162a may be configured to scale the exposure time setting parameters from the data storage 150a in response to the amount of scaling of the power setting parameters performed by the scaler 162b.

The scalers 162a-162b may be configured to shift the precalibrated values in the data storage 150a-150b by a coefficient. In an example, the scaler 162a may increase the calibration values of the exposure settings by 20% and the scaler 162b may decrease the calibration values of the power settings by 20% based on the measured temperatures. In another example, the scaler 162a may decrease the calibration values of the exposure settings by 20% and the scaler 162b may increase the calibration values of the power settings by 20% based on the measured temperatures. The amount of scaling performed by the coefficient may be determined based on a temperature range measured for the IR-LED 102 and/or the imager 104. In one example, the temperature range measured may be determined according to fuzzy logic (e.g., a high temperature, a low temperature, a medium temperature, a very high temperature, etc.). In another example, the temperature range measured may be determined according to a discrete temperature range (e.g., ranges of 5 degrees, ranges of 10 degrees, etc.). A different coefficient may be applied based on the temperature range measured (e.g., a 20% coefficient for a high temperature measurement, a 10% coefficient change for a medium temperature measurement, no change for a low temperature measurement, etc.). The amount selected for the coefficient (s) (e.g., the scalers 162a-162b) and/or the various temperature ranges measured for applying the particular coefficient values may be varied according to the design criteria of a particular implementation.

The compensation performed by one component (e.g., the power settings of the IR-LED 102 to compensate for less exposure time of the imager 104, or the exposure time setting of the imager 104 to compensate for lower power settings of the IR-LED 102) may be performed if the component that may perform the compensation is not in an overheated state. For example, if the IR-LED 102 and the imager 104 are measured by the processor 110 and both are determined to be overheating, the parameters for both the IR-LED 102 and the imager 104 may be reduced without compensation.

In the example shown, the temperature calibration circuit 152 may be implemented by the processor 110. In some embodiments, the data for the scaling operations performed by the scalers 162a-162b may be stored in the memory 112. Generally, the calculations performed for the scaling operations may be operations by the processor 110.

Figure 4:
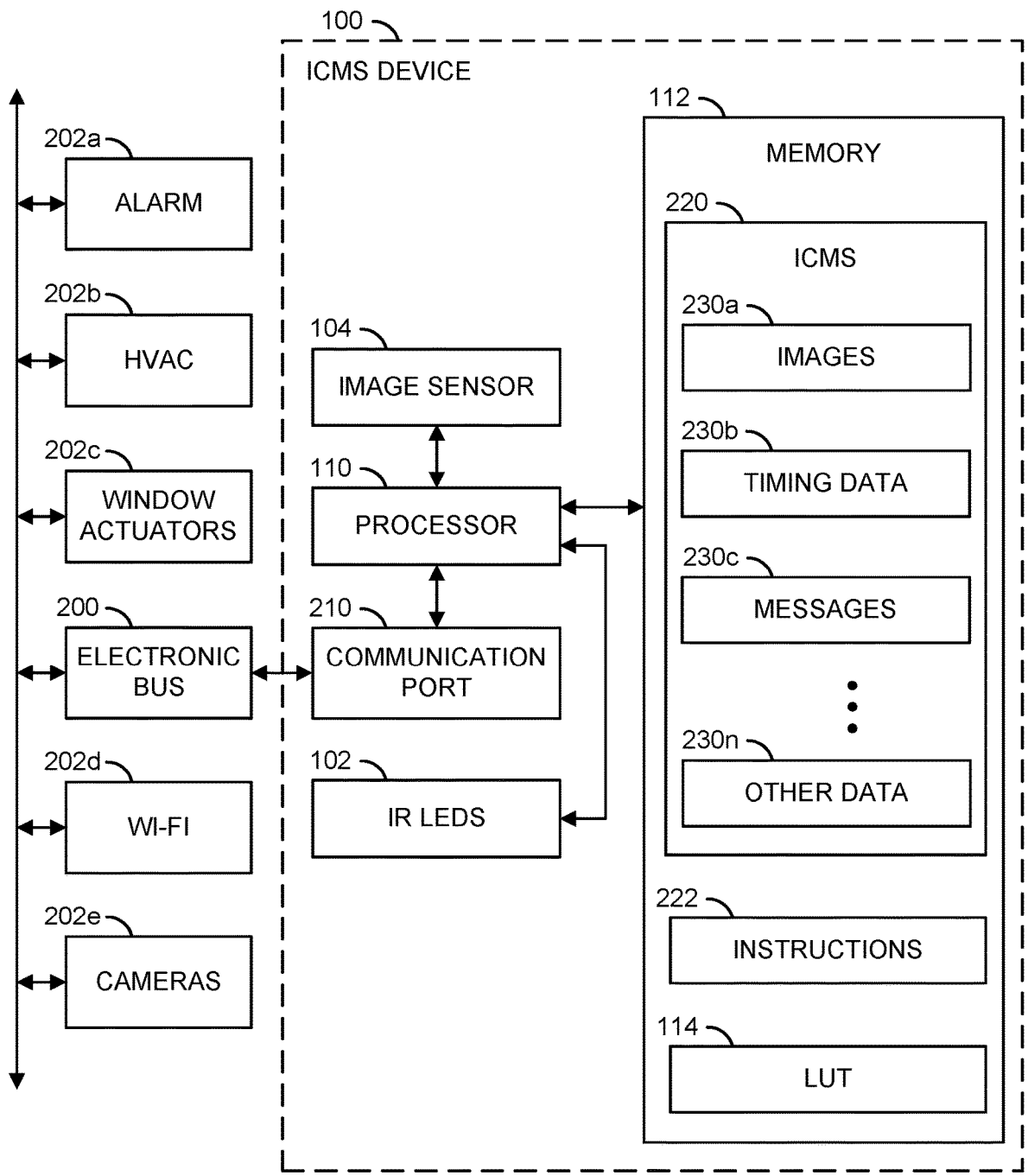
FIG. 4 is a block diagram illustrating components of a vehicle that may receive a warning or error message in response to a temperature reading.

Referring to FIG. 4, a block diagram illustrating components of a vehicle that may receive a warning or error message in response to a temperature reading is shown. The apparatus 100 is shown connected to an electronic bus 200.

The electronic bus 200 may be configured to enable various components within the vehicle 60 to exchange data. The electronic bus 200 may be bi-directional to enable the apparatus 100 to send and/or receive data to/from other components. In one example, the electronic bus 200 may be a CAN bus.

Various components 202a-202e are shown communicating on the electronic bus 200. In the example shown, the components 202a-202n may comprise an alarm 202a, a heating, ventilation and air conditioning (HVAC) system 202b, window actuators 202c, a wireless communications system 202d (e.g., Wi-Fi, Bluetooth, ZigBee, 3G/4G/LTE/5G, etc.), other vehicle cameras 202e (e.g., blindspot cameras, cameras used for autonomous driving, etc.), etc. Other vehicle components 202a-202n may be implemented (e.g., radar systems, door locks, security systems, etc.). The components communicating over the electronic bus 200 may comprise components and/or ECUs that may be powered off when the vehicle 60 is turned off and/or components and/or ECUs that may be powered on when the vehicle 60 is turned off. For example, the electronic bus 200 may enable the apparatus 100 to activate (e.g., wake up from an off state or a low-powered state) one or more components and/or ECUs that have been turned off. The apparatus 100 may configured to communicate over the electronic bus 200 to communicate with the components 202a-202n and/or with the ECUs that control the components 202a-202n.

The apparatus 100 (e.g., an ICMS device) is shown comprising the IR-LED 102, the imager 104, the processor 110, the memory 112 and/or a block (or circuit) 210. The circuit 210 may implement a communication port. The apparatus 100 may comprise other components (not shown). The number, type and/or arrangement of the components of the apparatus 100 may be varied according to the design criteria of a particular implementation.

The memory 112 may comprise the LUT 114, a block (or circuit) 220 and/or a block (or circuit) 222. The circuit 220 may comprise ICMS storage. The circuit 222 may comprise computer readable instructions. The memory 112 may be configured to store data presented by the IR-LED 102, the imager 104, the processor 110 and/or other sensors. The memory 112 may be configured to provide stored data and/or the computer readable instructions to the processor 110.

The apparatus 100 may be configured to generate presence information and/or IR (or NIR) images (e.g., from the imager 104) and/or generate IR (or NIR) light (e.g., from the IR-LED 102). In some embodiments, the apparatus 100 may implement other sensors. The other sensors may be configured to perform other types of measurements that may be relevant to determining the conditions within the interior 62 and/or the presence of the people 70a-70d (e.g., radar data, camera data, pressure, humidity, ultrasonic data, etc.).

In some embodiments, the apparatus 100 may implement a wireless communication module (not shown). In some embodiments, the apparatus 100 may communicate wirelessly by sending/receiving data to/from the electronic bus 200 via the Wi-Fi module 202d. The wireless communications may enable the apparatus 100 to communicate wirelessly. The wireless communications may implement one or more wireless communications protocols (e.g., GNSS, Wi-Fi, Bluetooth, ZigBee, NFC, etc.). The wireless communications may be configured to receive information from external sources and/or communicate data to the external sources. In one example, the wireless communications module may be configured to communicate with a smartphone. In one example, the wireless communications may be configured to communicate warnings and/or notifications (e.g., the signal MSG shown in association with FIG. 2). The signal MSG may comprise information about the operating status of the IR-LED 102 and/or the imager 104.

The communication port 210 may comprise a wired connection. The communication port 210 may be configured to enable communication via the electronic bus 200. The communication port 210 may enable the processor 110 to send/receive data over the electronic bus 200 to communicate with the components 202a-202n. The processor 110 may communicate the signal MSG via the communication port 210.

The ICMS storage 220 of the memory 112 may be configured to store data for the ICMS features. The ICMS storage 220 may comprise blocks (or circuits) 230a-230n. The blocks 230a-230n may store various data sets. For example, the data sets 230a-230n may comprise images 230a, timing data 230b, messages 230c and/or other data 230n.

The processor 110 may be configured to execute stored computer readable instructions (e.g., the instructions 222 stored in the memory 112). The processor 110 may perform one or more steps based on the stored instructions 222. In an example, one of the steps of the instructions 222 executed/performed by the processor 110 may receive (e.g., poll) the signal IS-TEMP from the imager 104 and/or receive the signal LED-TEMP from the IR-LED 102. In another example, one of the steps of the instructions 222 executed/performed by the processor 110 may determine a difference between the temperature of the IR-LED 102 and the predetermined temperature that corresponds to the parameters for the IR-LED 102 stored in the memory 112 and/or determine a difference between the temperature of the imager 104 and the predetermined temperature that corresponds to the parameters for the imager 104 stored in the memory 112. In yet another example, one of the steps of the instructions 222 executed/performed by the processor 110 may scale the parameters for the IR-LED 102 based on the difference between the temperature of the IR-LED 102 and the predetermined temperature in order to compensate for a potential performance degradation caused by the temperature change and/or scale the parameters for the imager 104 based on the difference between the temperature of the imager 104 and the predetermined temperature in order to compensate for a potential performance degradation caused by the temperature change. In still another example, one of the steps of the instructions 222 executed/performed by the processor 110 may scale the parameters for the imager 104 to compensate for the potential performance degradation caused by scaling the parameters for the IR-LED 102 and/or scale the parameters for the IR-LED 102 to compensate for the potential performance degradation caused by scaling the parameters for the imager 104. The instructions executed and/or the order of the instructions 222 performed by the processor 110 may be varied according to the design criteria of a particular implementation.

The images 230a may comprise the IR (or NIR) images generated by the imager 104 and/or the RGB images generated by the imager 104. The images 230a may be used by the apparatus 100 and/or other components of the vehicle 60 (e.g., a video processor configured to perform computer vision operations) to detect the people 70a-70d and/or the characteristics and/or behavior of the people 70a-70d in the interior 62 of the vehicle 60. In some embodiments, the images 230a may be analyzed to determine the parameters to store in the LUT 114. For example, computer vision may be implemented to compare the images 230a to reference images to determine whether the parameters stored in the LUT 114 are producing high quality images (e.g., images without artifacts, images that display the expected amount of details, images that provide suitable information to be used for computer vision operations, etc.). The parameters stored in the LUT 114 (e.g., the default parameters, the ideal parameters, the parameters for the predetermined temperature, etc.) may be updated in response to the data extracted from the images 230a.

The timing data 230b may comprise settings for polling the temperature device 122 of the IR-LED 102 and/or the embedded temperature sensor 132 of the imager 104. The processor 110 may be configured to poll the temperature device 122 to receive the signal LED-TEMP in response to a timer set by the timing data 230b. The processor 110 may be configured to poll the embedded temperature device 122 to receive the signal IS-TEMP in response to a timer set by the timing data 230b. The timer for polling the signal LED-TEMP and the timer for polling the signal IS-TEMP may be set to different frequencies. For example, the processor 110 may periodically poll the IR-LED 102 and the imager 104 at different rates. The length of the timer for the IR-LED 102 and/or the imager 104 may be varied according to the design criteria of a particular implementation.

The messages 230c may comprise data that may be communicated by the processor 110 as the signal MSG. The messages 230c may comprise warnings, errors and/or general status information. The messages 230c may comprise error codes (e.g., an error code indicating that the IR-LED 102 has overheated, an error code indicating that the imager 104 has overheated, an error code that both the IR-LED 102 and the imager 104 have overheated, an error code that the apparatus 100 is unable to produce the images 230a, etc.). The messages 230c may comprise communication profiles to enable the apparatus 100 to communicate according to a protocol used by the various components 202a-202n. The messages 230c may be communicated as the signal MSG over the electronic bus 200 to the various components 202a-202n. The contents of the messages 230c may be varied according to the design criteria of a particular implementation.

In one example, the messages 230c may comprise an error message when the processor 110 determines that both the IR-LED 102 and the imager 104 have overheated. For example, the signal MSG may communicate that the apparatus 100 is not capable of generating the images 230a until the operating temperature of either the IR-LED 102 or the imager 104 has cooled off. For example, a safety feature may be temporarily disabled in response to the signal MSG providing an error (e.g., an alert for drowsiness detection may not be available). In another example, the messages 230c may comprise a warning message when the processor 110 determines that one of the IR-LED 102 or the imager 104 has overheated (but the other has not). For example, the signal MSG may communicate that the images 230a may be generated but may not be as accurate as during ideal operating conditions. In one example, the signal MSG may comprise a warning message that may be communicated to the Wi-Fi module 202d in order to send a notification to a smartphone indicating that one of the IR-LED 102 and/or the imager 104 is starting to increase in temperature. In another example, the signal MSG may comprise an error message communicated to a drowsiness alert system indicating that the images generated may not be reliable while the IR-LED 102 and/or the imager 104 is overheated. Generally, the messages 230c may not be generated when both the IR-LED 102 and the imager 104 are operating at ideal temperatures. In some embodiments, the signal MSG may comprise debugging information that may be sent even while the IR-LED 102 and the imager 104 are operating at ideal temperatures.

The other data 230n may comprise other data that may be relevant to determining the characteristics of the people detected 70a-70d, determining the operating conditions of the IR-LED 102, determining the operating conditions of the imager 104, determining the amount of scaling of the parameters to perform for the IR-LED 102 and/or the imager 104, etc. In one example, the other data 230n may comprise characteristics, size information and/or behavior information detected about the people 70a-70d in response to the images 230a. The types of data stored by the other data 230n may be varied according to the design criteria of a particular implementation.

Figure 5:
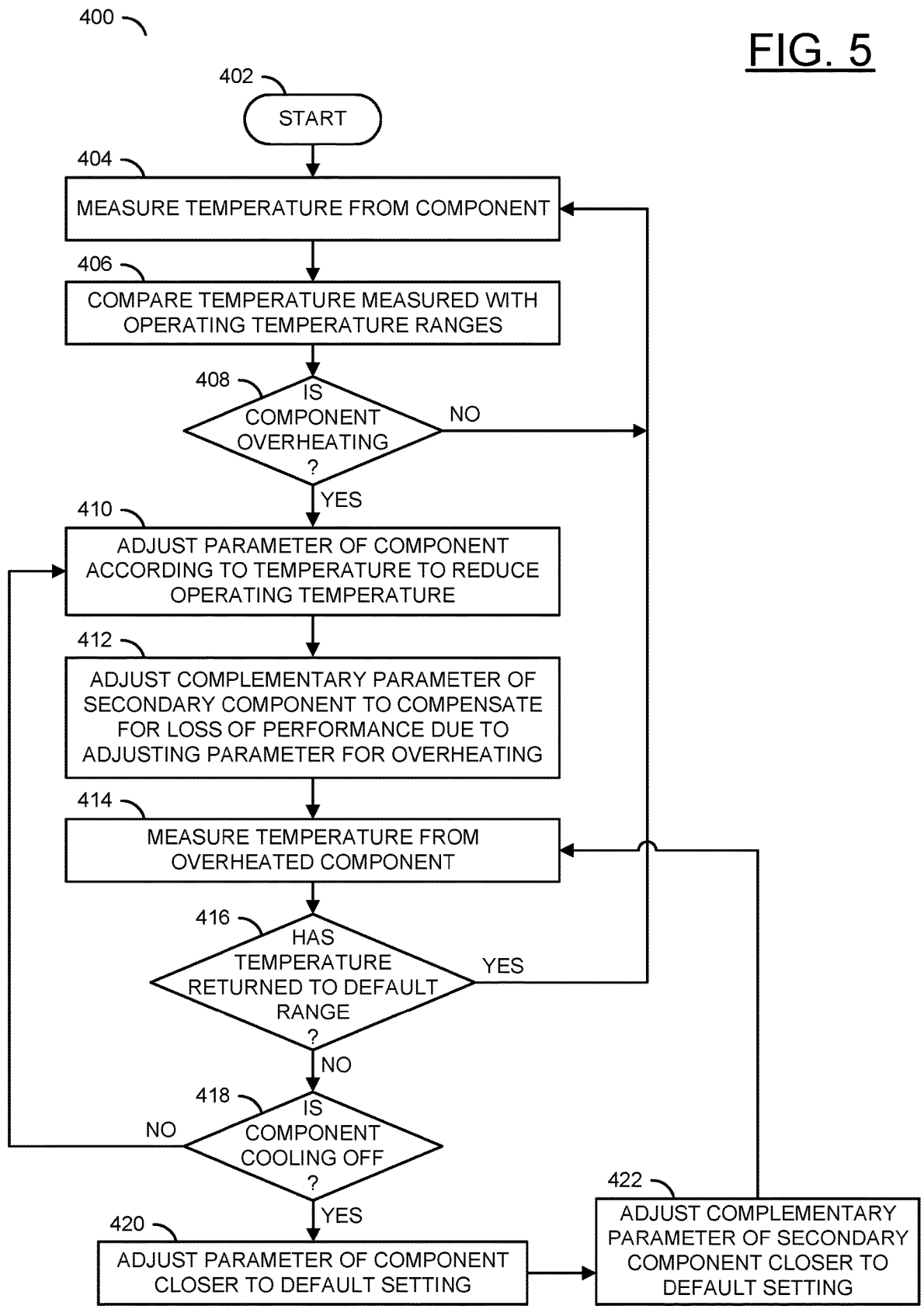
FIG. 5 is a flow diagram illustrating a method for compensating for adjusting parameters in response to a temperature change.

Referring to FIG. 5, a method (or process) 400 is shown. The method 400 may compensate for adjusting parameters in response to a temperature change. The method 400 generally comprises a step (or state) 402, a step (or state) 404, a step (or state) 406, a decision step (or state) 408, a step (or state) 410, a step (or state) 412, a step (or state) 414, a decision step (or state) 416, a decision step (or state) 418, a step (or state) 420, and a step (or state) 422.

The step 402 may start the method 400. In the step 404, the processor 110 may measure a temperature from a component. The temperature may be received from a temperature sensor and/or inferred based on various attributes of circuitry of the component. Next, in the step 406, the processor 110 may compare the temperature measured with a range of operating temperatures. In an example, the processor 110 may receive the signal PARAM from the memory 112 to determine an operating temperature for the component measured. Next, the method 400 may move to the decision step 408.

In the decision step 408, the processor 110 may determine whether the component measured is overheating. The component may be overheating when the measured temperature is above the operating temperature range. A temperature that may be considered overheating may depend on the ambient temperature, the amount of cooling available (e.g., fans, fan speed, etc.) and/or the sensitivity of the operations performed by the component. If the component is not overheating, then the method 400 may return to the step 404. If the component is overheating, then the method 400 may move to the step 410.

In the step 410, the processor 110 may adjust a parameter of the component according to the temperature to reduce the operating temperature. For example, various operating parameters of the component may affect the amount of heat generated during operation. In an example, the exposure time of the imager 104 may affect the amount of heat generated (e.g., longer exposure, more heat). In another example, the power settings of the IR-LED 102 may affect the amount of heat generated (e.g., more power, more heat). In yet another example, the frequency of the IR-LED 102 may affect the amount of heat generated (e.g., higher frequency, more heat). In still another example, the processing speed of the processor 110 may affect the amount of heat generated (e.g., higher clock speed, more heat). While embodiments of the present invention generally describe balancing the heat generated by the IR-LED 102 and the imager 104, the heat generated by other components may be similarly balanced. Next, the method 400 may move to the step 412.

In the step 412, the processor 110 may adjust a complementary parameter of a secondary component in order to compensate for the loss of performance due to adjusting the parameter of the measured component to prevent the overheating. In an example, the measured component may operate together with the secondary component to perform a common result. In an example, the IR-LED 102 may operate together with the imager 104 to perform a result of generating IR/NIR images. A complementary parameter may be a parameter of the secondary component that affects the functionality of the adjusted parameter of the measured component. In an example, the power settings of the IR-LED 102 may be complementary to the exposure time of the imager 104 (e.g., increasing the exposure time may compensate for the loss of performance due to the reduced power settings). Adjusting a parameter that is not complementary may not compensate for the loss of performance (e.g., changing a zoom level of lens for the imager 104 may not compensate for the loss of performance due to lower power settings of the IR-LED 102). Next, in the step 414, the processor 110 may measure the temperature of the overheated component. Next, the method 400 may move to the decision step 416.

In the decision step 416, the processor 110 may determine whether the temperature of the measured component has returned to a default range (e.g., a safe operating range that may not result in loss of performance). For example, the processor 110 may check whether adjusting the parameter has lowered the temperature to below the overheating temperature. If the temperature has returned to the default range, then the method 400 may return to the step 404. If the temperature has not returned to the default range, then the method 400 may move to the decision step 418.

In the decision step 418, the processor 110 may determine whether the measured component is cooling off. For example, the processor 110 may determine whether the temperature has dropped due to adjusting the parameter. If the component is not cooling off, then the method 400 may return to the step 410 (e.g., the parameter may be adjusted even lower and/or an error message may be generated). If the component is cooling off, then the method 400 may move to the step 420. In the step 420, the processor 110 may re-adjust the parameter of the measured component to closer to the default setting (e.g., return closer to normal operation). Next, in the step 422, the processor 110 may adjust the complementary parameter of the secondary component closer to the default setting (e.g., less compensation may be needed when the measured component is operating closer to normal settings). Next, the method 400 may return to the step 414.

Figure 6:
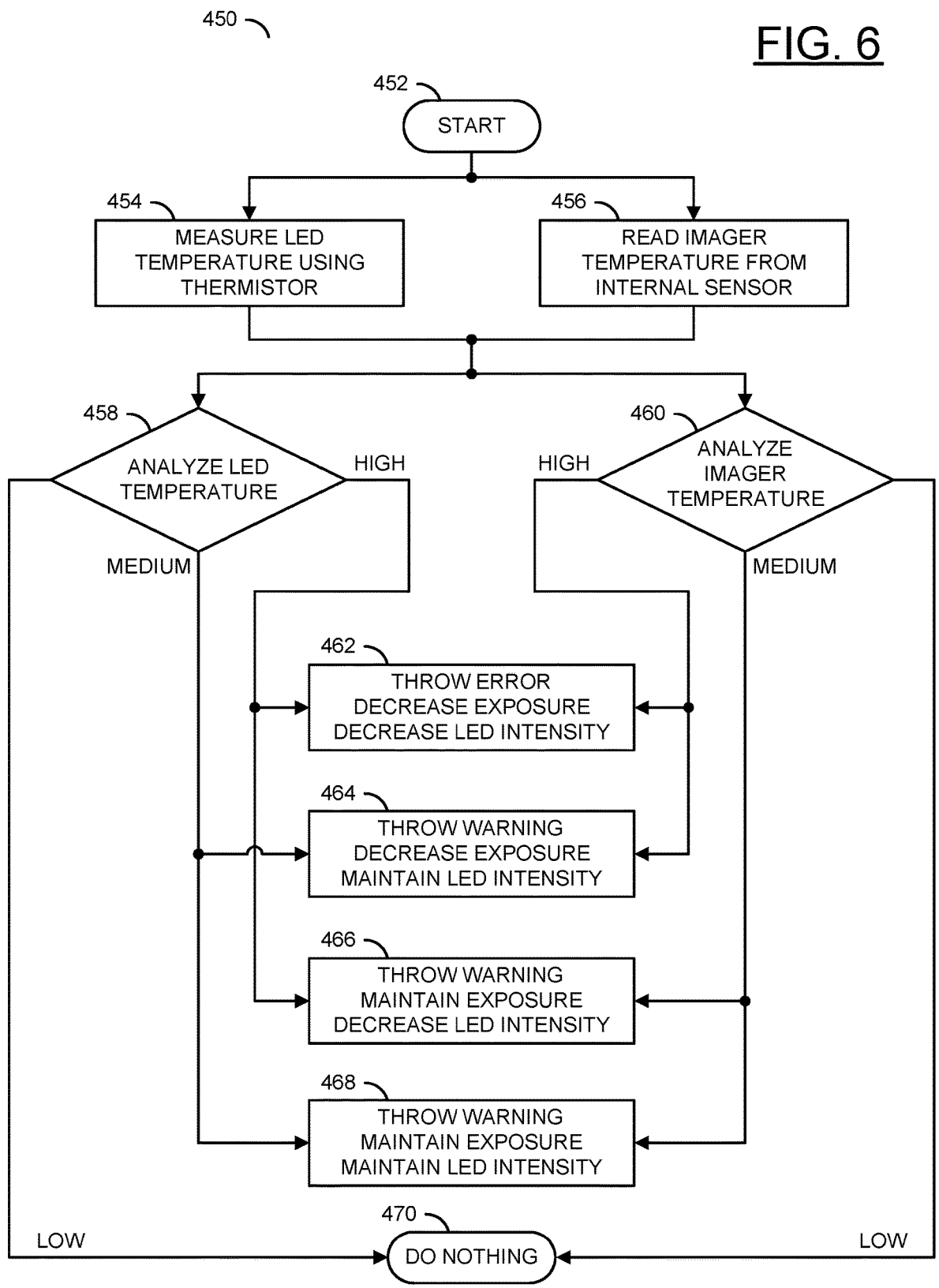
FIG. 6 is a flow diagram illustrating a method for implementing imager time and lighting heat balancing.

Referring to FIG. 6, a method (or process) 450 is shown. The method 450 may implement imager time and lighting heat balancing. The method 450 generally comprises a step (or state) 452, a step (or state) 454, a step (or state) 456, a decision step (or state) 458, a decision step (or state) 460, a step (or state) 462, a step (or state) 464, a step (or state) 466, a step (or state) 468, and a step (or state) 470.

The step 452 may start the method 450. Next, the method 450 may move to the step 454 and the step 456. In the step 454, the processor 110 may measure the temperature of the IR-LED 102 using the temperature device 122 (e.g., a thermistor). In the step 456, the processor 110 may read the temperature of the imager 104 from the temperature sensor 132. For example, the processor 110 may receive the signal LED-TEMP and the signal IS-TEMP at approximately the same time (e.g., the temperature measurement may be performed generally in parallel). Next, the method 450 may move to the decision step 458 and to the decision step 460.

In the decision step 458, the processor 110 may analyze the temperature of the IR-LED 102. In the decision step 460, the processor 110 may analyze the temperature of the imager 104. The processor 110 may analyze the temperature of the IR-LED 102 and the temperature of the imager 104 at approximately the same time (e.g., the analysis of the temperatures may be performed generally in parallel). The response of the processor 110 to the analysis of the temperatures may depend on the result of the analysis for both the IR-LED 102 and the imager 104. In the example shown, the temperature may be measured according to fuzzy logic (e.g., with results of high to indicate excessive heat, medium or low). The temperature ranges for a high, medium or low temperature may be different between the IR-LED 102 and the imager 104. The temperature ranges that may be considered high, medium, or low may be stored in the other data 230n of the memory 112.

If the temperature of the IR-LED 102 is high and the temperature of the imager 104 is high, then the method 450 may move to the step 462. In the step 462, the processor 110 may generate the signal MSG comprising an error. The processor 110 may generate the signal IS-ADJUST to decrease the exposure time parameter of the imager 104 and generate the signal LED-ADJUST to decrease the power settings of the IR-LED 102 (e.g., decrease the intensity of the LEDs 120). Since both components are overheating, the complementary parameter of the other component may not be capable of compensating for the decrease in performance caused by decreasing a parameter. For example, the IR (or NIR) images may have a temporary reduction in quality and/or reliability while both components are overheating. The signal MSG may comprise the error message about the overheating state of the IR-LED 102 and the imager 104. Next, the method 450 may return to the steps 454 and If the temperature of the IR-LED 102 is medium and the temperature of the imager 104 is high, then the method 450 may move to the step 464. In the step 464, the processor 110 may generate the signal MSG comprising a warning. The processor 110 may generate the signal IS-ADJUST to decrease the exposure time parameter of the imager 104 and generate the signal LED-ADJUST to maintain the power settings of the IR-LED 102 (e.g., keep the current intensity of the LEDs 120). Since only the imager 104 is overheating, the complementary parameter (e.g., the power settings) of the IR-LED 102 may be capable of compensating for the decrease in performance caused by decreasing the exposure setting of the imager 104. For example, the power settings of the IR-LED 102 may be set the same or increased in order to compensate for the imager 104. The signal MSG may comprise a warning that logs the overheating state of the imager 104. Next, the method 450 may return to the steps 454 and 456.

If the temperature of the IR-LED 102 is high and the temperature of the imager 104 is medium, then the method 450 may move to the step 466. In the step 466, the processor 110 may generate the signal MSG comprising a warning. The processor 110 may generate the signal IS-ADJUST to maintain the exposure time parameter of the imager 104 (e.g., keep the current exposure time of the imaging circuitry 130) and generate the signal LED-ADJUST to decrease the power settings of the IR-LED 102 (e.g., reduce the intensity of the LEDs 120). Since only the IR-LED 102 is overheating, the complementary parameter (e.g., the exposure time settings) of the imager 104 may be capable of compensating for the decrease in performance caused by decreasing the power setting of the IR-LED 102. For example, the exposure settings of the imager 104 may be set the same or increased in order to compensate for the IR-LED 102. The signal MSG may comprise a warning that logs the overheating state of the IR-LED 102. Next, the method 450 may return to the steps 454 and 456. If the temperature of the IR-LED 102 is medium and the temperature of the imager 104 is medium, then the method 450 may move to the step 468. In the step 468, the processor 110 may generate the signal MSG comprising a warning. The processor 110 may keep the current exposure time settings for the imaging circuitry 130 and/or generate the signal IS-ADJUST to perform a minor adjustment of the exposure time parameter of the imager 104. Similarly, the processor 110 may keep the current power settings for the LEDs 120 and/or generate the signal LED-ADJUST to perform a minor adjustment of the power settings of the IR-LED 102. For example, the minor adjustments may adjust the parameters in order to prevent further increases in temperature (e.g., prevent the IR-LED 102 from overheating and/or prevent the imager 104 from overheating). Since neither the IR-LED 102 nor the imager 104 is overheating, the complementary parameters may not need to be adjusted for compensation. The signal MSG may comprise a warning that logs an increase in temperature of the IR-LED 102 and/or the imager 104. Next, the method 450 may return to the steps 454 and 456.

If the temperature of the IR-LED 102 is low and the temperature of the imager 104 is low, then the method 450 may move to the step 470. In the step 470, the processor 110 may not perform any adjustments. Since neither the IR-LED 102 nor the imager 104 is overheating or increasing in temperature, the parameters may not need adjustment or compensation. Next, the method 450 may return to the steps 454 and 456.

Figure 7:
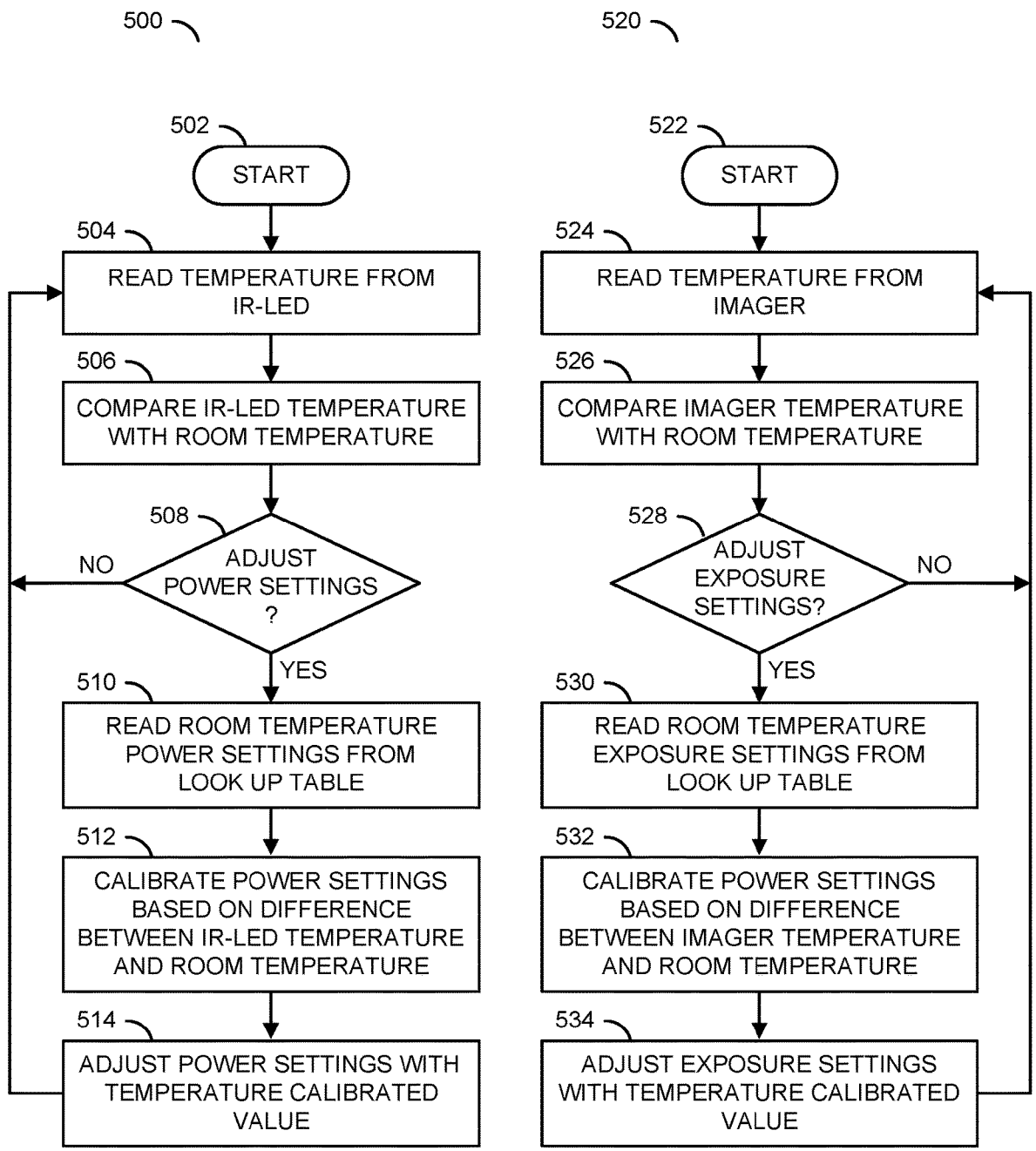
FIG. 7 is a flow diagram illustrating a method for calibrating settings for both an IR-LED and an imager in response to temperature measurements.

Referring to FIG. 7, a method (or process) 500 is shown. The method 500 and the method 520 may calibrate settings for both an IR-LED and an imager in response to temperature measurements. The method 500 generally comprises a step (or state) 502, a step (or state) 504, a step (or state) 506, a decision step (or state) 508, a step (or state) 510, a step (or state) 512, and a step (or state) 514. The method 520 generally comprises a step (or state) 522, a step (or state) 524, a step (or state) 526, a decision step (or state) 528, a step (or state) 530, a step (or state) 532, and a step (or state) 534. The processor 110 may generally perform the method 500 and the method 520 in parallel or substantially in parallel.

The step 502 may start the method 500. In the step 504, the processor 110 may read the temperature from the IR-LED 102. For example, the processor 110 may receive the signal LED-TEMP. Next, in the step 506, the processor 110 may compare the temperature from the signal LED-TEMP with the room temperature. For example, the LUT 114 may comprise parameters for the IR-LED 102 at a predetermined temperature (e.g., room temperature). Next, the method 500 may move to the decision step 508.

In the decision step 508, the processor 110 may determine whether to adjust the power settings of the IR-LED 102. For example, the processor 110 may determine whether to adjust the power settings in response to a difference between the temperature measured in the signal LED-TEMP and the predetermined temperature that corresponds to the parameters stored by the LUT 114. If the processor 110 determines not to adjust the power settings, then the method 500 may return to the step 504. If the processor 110 determines to adjust the power settings, then the method 500 may move to the step 510.

In the step 510, the processor 110 may read the room temperature power settings 150*b* from the LUT 114. For example, the processor 110 may receive the signal LED-PARAM. Next, in the step 512, the processor 110 may calibrate the power settings based on the difference between the temperature of the IR-LED 102 and room temperature. For example, the LED scaler 162*b* may perform the scaling operations on the room temperature IR LED power settings 150*b* based on the difference between the measured temperature and room temperature to perform the calibration. In the step 514, the processor 110 may generate the signal LED-ADJUST based on the scaling operation in order to adjust the power settings of the LEDs 120 with the temperature calibrated value. Next, the method 500 may return to the step 504.

The step 522 may start the method 520. In the step 524, the processor 110 may read the temperature from the imager 104. For example, the processor 110 may receive the signal IS-TEMP. Next, in the step 526, the processor 110 may compare the temperature from the signal IS-TEMP with the room temperature. For example, the LUT 114 may comprise parameters for the imager 104 at a predetermined temperature (e.g., room temperature). Next, the method 520 may move to the decision step 528.

In the decision step 528, the processor 110 may determine whether to adjust the exposure of the imager 104. For example, the processor 110 may determine whether to adjust the exposure settings in response to a difference between the temperature measured in the signal IS-TEMP and the predetermined temperature that corresponds to the parameters stored by the LUT 114. If the processor 110 determines not to adjust the exposure settings, then the method 520 may return to the step 524. If the processor 110 determines to adjust the exposure settings, then the method 520 may move to the step 530.

In the step 530, the processor 110 may read the room temperature exposure settings 150*a* from the LUT 114. For example, the processor 110 may receive the signal IS-PARAM. Next, in the step 532, the processor 110 may calibrate the exposure settings based on the difference between the temperature of the imager 104 and room temperature. For example, the imager scaler 162*a* may perform the scaling operations on the room temperature infrared image sensor exposure settings 150*a* based on the difference between the measured temperature and room temperature to perform the calibration. In the step 534, the processor 110 may generate the signal IS-ADJUST based on the scaling operation in order to adjust the exposure settings of the imaging circuitry 130 with the temperature calibrated value. Next, the method 520 may return to the step 524.

In some embodiments, the method 500 may calibrate the power setting parameters for the IR-LED 102 at the same time as the method 520 calibrates the exposure setting parameters for the imager 104. In some embodiments, the method 500 may be performed at a higher frequency or a lower frequency than the method 520.

Figure 8:
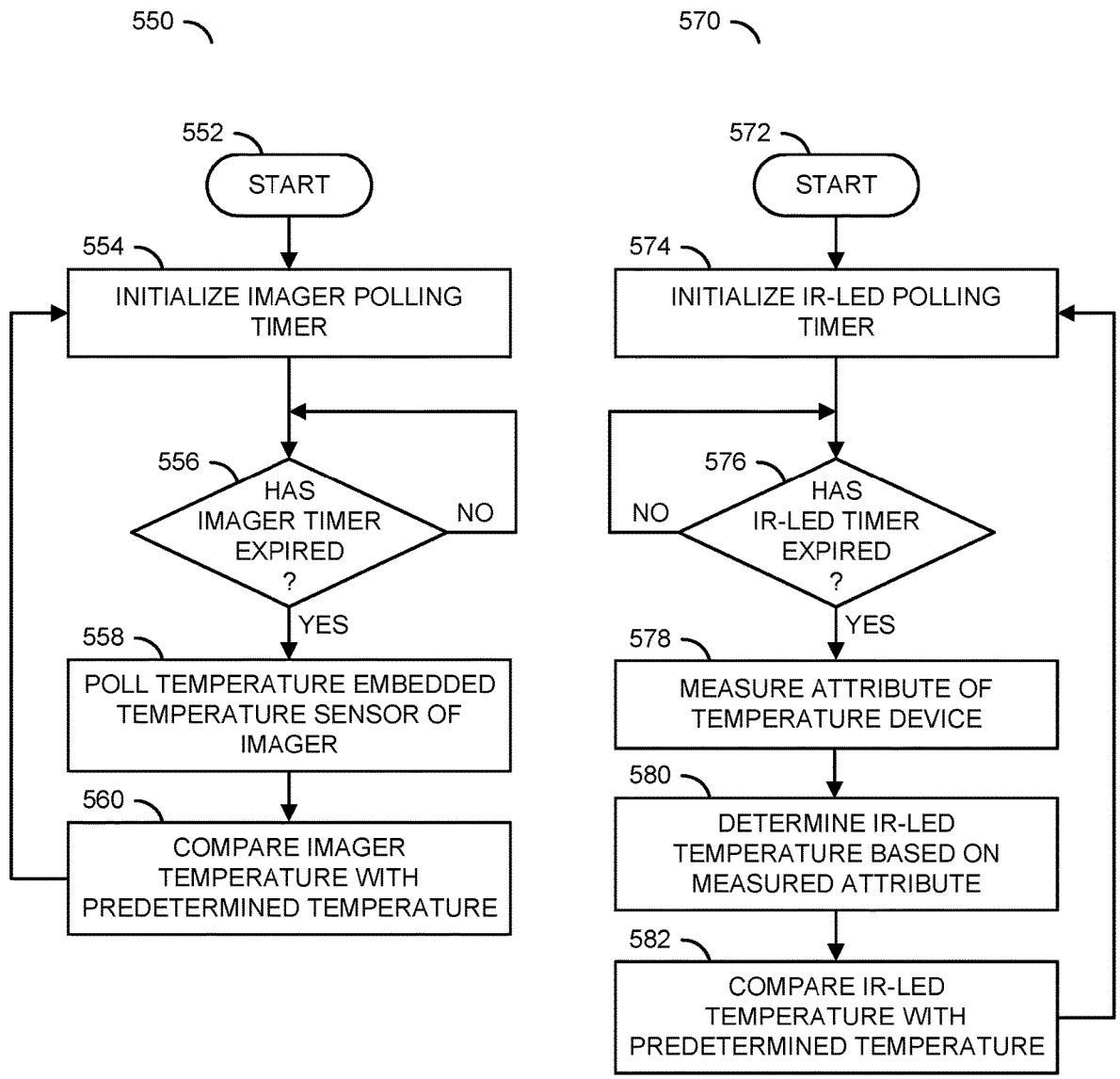
FIG. 8 is a flow diagram illustrating a method for polling a temperature reading for both an IR-LED and an imager.

Referring to FIG. 8, a method (or process) 550 is shown. The method 550 and the method 570 may poll a temperature reading for both an IR-LED and an imager. The method 550 generally comprises a step (or state) 552, a step (or state) 554, a decision step (or state) 556, a step (or state) 558, and a step (or state) 560. The method 570 generally comprises a step (or state) 572, a step (or state) 574, a decision step (or state) 576, a step (or state) 578, a step (or state) 580, and a step (or state) 582. The processor 110 may generally perform the method 550 and the method 570 in parallel or substantially in parallel.

The step 552 may start the method 550. In the step 554, the processor 110 may initialize a timer for polling the temperature of the imager 104. The timer for polling the temperature of the imager 104 may be set to the same time limit as a timer for reading the temperature of the IR-LED 102 or set to a different amount of time. In an example, the timer for the polling the imager 104 may be set in the other data 230*n*. Next, the method 550 may move to the decision step 556.

In the decision step 556, the processor 110 may determine whether the imager timer has expired. If the imager timer has not expired, then the processor 110 may return to the decision step 556 to wait for the imager timer to expire (the processor 110 may perform other operations while waiting). If the imager timer has expired, then the method 550 may move to the step 558. In the step 558, the processor 110 may poll the embedded temperature sensor 132 of the imager 104. For example, the processor 110 may poll the embedded temperature sensor 132 using the signal IS-TEMP. For example, the embedded temperature sensor 132 may comprise a bank of diodes that may be used to infer the temperature of the imager 104 based on a linear relationship between voltage and temperature of the diodes. Next, in the step 560, the processor 110 may compare the temperature of the imager 104 with the predetermined temperature that corresponds to the room temperature infrared image sensor exposure settings 150*a* in the LUT 114. Next, the method 550 may return to the step 554.

The step 572 may start the method 570. In the step 574, the processor 110 may initialize a timer for polling the temperature of the IR-LED 102. The timer for polling the temperature of the IR-LED 102 may be set to the same time limit as a timer for reading the temperature of the imager 104 or set to a different amount of time. In an example, the timer for the polling the IR-LED 102 may be set in the other data 230*n*. Next, the method 570 may move to the decision step 576.

In the decision step 576, the processor 110 may determine whether the IR-LED timer has expired. If the IR-LED timer has not expired, then the processor 110 may return to the decision step 576 to wait for the IR-LED timer to expire (the processor 110 may perform other operations while waiting). If the IR-LED timer has expired, then the method 570 may move to the step 578. In the step 578, the processor 110 may measure an attribute of the temperature device 122 of the IR-LED 102. For example, the processor 110 may read the temperature device 122 using the signal LED-TEMP. In one example, the LEDs 120 may comprise a bank of diodes that may be used to infer the temperature of the LEDs 120 based on a linear relationship between voltage and temperature of the diodes. In another example, the processor 110 may measure a resistance of a PTC or an NTC resistor to infer the temperature of the LEDs 120. Next, in the step 580, the processor 110 may determine the temperature of the IR-LED 102 based on the measured attribute (e.g., based on the resistance of the PTC resistor, based on the resistance of the NTC resistor, based on the voltage drop of the diodes, etc.). In the step 582, the processor 110 may compare the temperature of the IR-LED 102 with the predetermined temperature that corresponds to the room temperature IR LED power settings 150*b* in the LUT 114. Next, the method 570 may return to the step 574.

In some embodiments, the method 550 may measure the temperature of the imager 104 at the same time as the method 570 measures the temperature for the IR-LED 102. In some embodiments, the method 550 may be performed at a higher frequency or a lower frequency than the method 570.

The functions performed by the diagrams of FIGS. 1-8 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processor, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   a memory comprising (i) first parameters for an image sensor and (ii) second parameters for a light emitting device; and
   a processor configured to (i) receive a first temperature signal from said image sensor, (ii) receive a second temperature signal from said light emitting device, (iii) present a first adjustment signal to said image sensor and (iv) present a second adjustment signal to said light emitting device, wherein
   (a) said first parameters and said second parameters correspond to a predetermined temperature,
   (b) said first adjustment signal is configured to scale said first parameters based on a difference between said first temperature signal and said predetermined temperature,
   (c) said second adjustment signal is configured to scale said second parameters based on a difference between said second temperature signal and said predetermined temperature and
   (d) said processor scales said first parameters and said second parameters in order to compensate for performance degradation of (i) said image sensor caused by changes in said first temperature signal and (ii) said light emitting device caused by changes in said second temperature signal.

2. The apparatus according to claim 1, wherein said (i) said image sensor is a near infrared image sensor, (ii) said near infrared image sensor enables in cabin monitoring of a vehicle and (iii) said light emitting device comprises near infrared light emitting diodes configured to provide illumination for said near infrared image sensor.

3. The apparatus according to claim 1, wherein said memory comprises a lookup table for said first parameters and said second parameters.

4. The apparatus according to claim 1, wherein said processor is configured to scale said first parameters and said second parameters by extrapolating settings in response to said difference between said first temperature signal and said second temperature signal from said predetermined temperature.

5. The apparatus according to claim 1, wherein said performance degradation of said image sensor and said light emitting device is caused by excessive heat.

6. The apparatus according to claim 1, wherein said first parameters comprise an exposure time of said image sensor and said second parameters comprise a power setting of said light emitting device.

7. The apparatus according to claim 6, wherein said first parameters are scaled to reduce said exposure time as said first temperature signal from said image sensor increases from said predetermined temperature and said power setting of said light emitting device is increased.

8. The apparatus according to claim 6, wherein said second parameters are scaled to reduce said power setting as said second temperature signal from said light emitting device increases from said predetermined temperature and said exposure time of said image sensor is increased.

9. The apparatus according to claim 1, wherein (i) said image sensor comprises a built-in temperature sensor configured to provide said first temperature signal and (ii) said processor is configured to poll said built-in temperature sensor.

10. The apparatus according to claim 1, wherein (i) said light emitting device comprises a positive temperature coefficient (PTC) resistor, (ii) said PTC resistor is implemented having a linear resistance curve and (iii) and said processor is configured to determine said second temperature signal based on a resistance of said PTC resistor.

11. The apparatus according to claim 1, wherein (i) said light emitting device comprises a negative temperature coefficient (NTC) resistor, (ii) said NTC resistor is implemented having a linear resistance curve and (iii) and said processor is configured to determine said second temperature signal based on a resistance of said NTC resistor.

12. The apparatus according to claim 1, wherein said processor is configured to read said second temperature signal in response to measuring a current through diodes of said light emitting device.

13. The apparatus according to claim 12, wherein (i) said diodes have a flat drop voltage across a wide temperature range and (ii) a voltage sensor is implemented by said light emitting device and used to determine said current through said diodes.

14. The apparatus according to claim 1, wherein said apparatus is an electronic control unit (ECU) of a vehicle.

15. The apparatus according to claim 1, wherein said apparatus implements an imager time and lighting heat balancing.

16. The apparatus according to claim 1, wherein said image sensor and said light emitting device are configured to operate together to generate images of an interior of a vehicle.

17. The apparatus according to claim 16, wherein (i) scaling said first parameters prevents said image sensor from overheating, (ii) said processor is further configured to adjust said second parameters to compensate for a degradation of said images generated caused by scaling said first parameters and (iii) said second parameters complement a functionality of said image sensor for generating said images affected by said first parameters.

18. The apparatus according to claim 16, wherein (i) scaling said second parameters prevents said light emitting device from overheating, (ii) said processor is further configured to adjust said first parameters to compensate for a degradation of said images generated caused by scaling said second parameters and (iii) said first parameters complement a functionality of said light emitting device for generating said images affected by said first parameters.

* * * * *